UNITED STATES PATENT OFFICE.

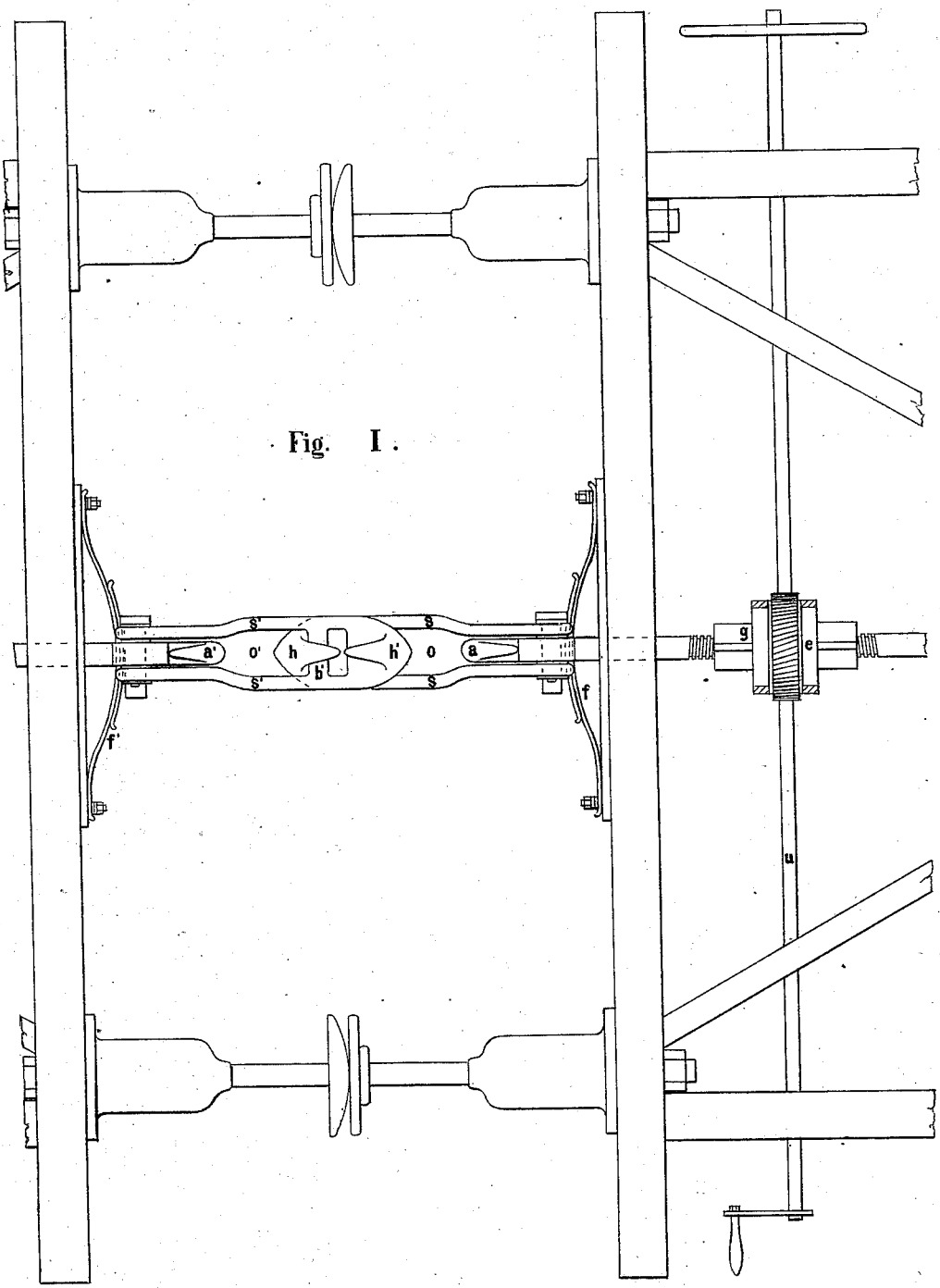

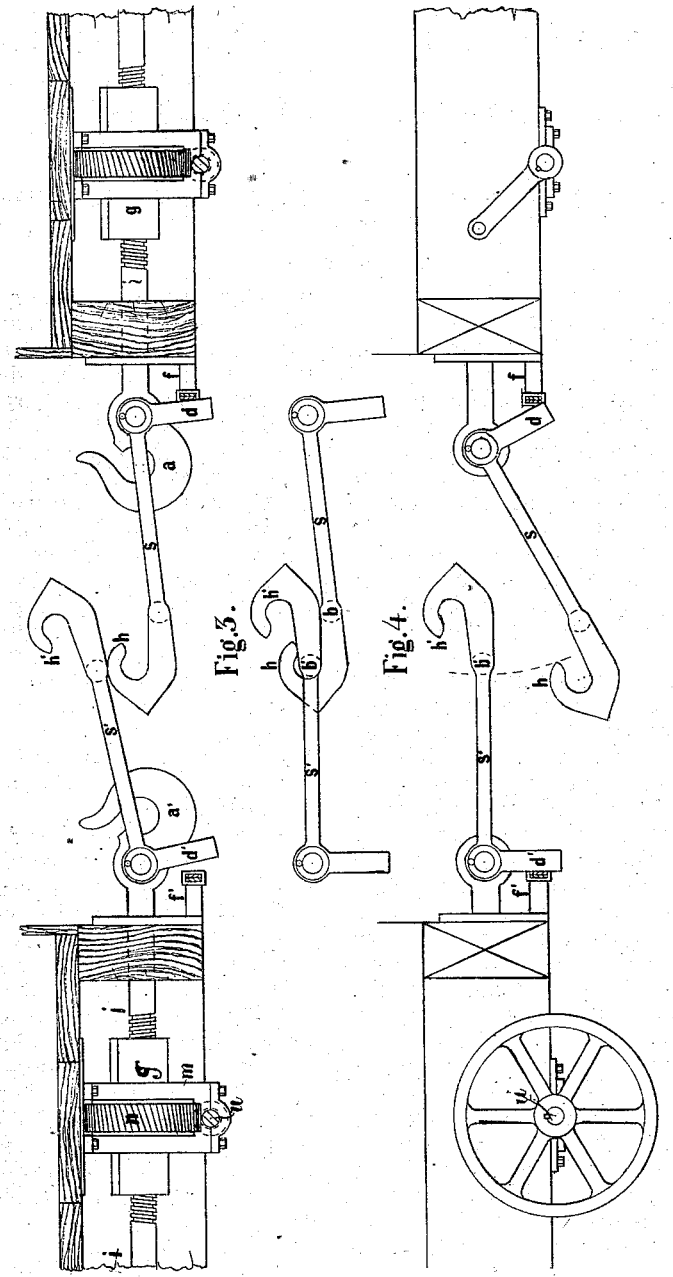

ANDREW COULTER, OF RIGA, RUSSIA.

IMPROVEMENT IN CAR-COUPLINGS.

Specification forming part of Letters Patent No. 158,915, dated January 19, 1875; application filed December 16, 1874.

*To all whom it may concern:*

Be it known that I, ANDREW COULTER, of the city of Riga, Russia, have invented certain Improvements in Railroad-Car Couplings, of which the following is a specification:

The object of my invention is to provide a car-coupling by means of which railroad-cars may be connected to and disconnected from each other without the necessity of an attendant passing between them.

In the accompanying sheets of drawing, Figure 1 is a top view of my improved coupling device; and Figs. 2, 3, and 4 are side views, showing the device in different positions.

The main part of the coupling consists of a hook, $h$, forged in one piece, with two arms, $s\ s$, which have eyes of the same size as that in the common coupling-hook $a$, to which the said arms are connected by a pin or bolt. The hook $h$ is turned upward, and is arranged to pass freely between and lock into the end of the opening $o'$, between the two arms, $s'\ s'$, of the hook $h$ of the adjoining car. Short arms $d$ project downward from the arms $s\ s$ at the point where the latter are connected to the hook $a$, and these short arms bear against a spring, $f$, attached to the carriage, so that when ready for action the arms $s\ s$ will be in a horizontal position.

When the two cars have to be coupled together the tapering end of the hook $h$ is slightly lower than and will pass under the hook $h'$, and will lift the latter, as shown in Fig. 2, and as soon as the lower hook has passed on far enough the lifted hook will fall by its own weight, and its two arms, $s'\ s'$, will embrace the hook $h$, so that, on the receding of one or both cars, the said hook $h$ will catch against the end of the opening between the two arms $s'\ s'$. In order to disengage the couplings, I employ the device illustrated in Figs. 1 and 2. The draw-bar $i$ is cut in two at a point near the end of the car, and a right-handed screw-thread is formed on the end of one part of the severed bar, and a left-hand thread on the other part, and these threads are adapted to a screw-coupling, $g$, which can slide freely in, but not turn independently of, a worm-wheel, $n$, the latter being confined longitudinally by a hanger, $n$, secured to the frame of the car. A worm on a shaft, $u$, gears into the worm-wheel $n$, and this shaft extends beyond the frame of the car, where it can be furnished with a crank-handle or hand-wheel, by turning which the coupling-rod can be lengthened or shortened at pleasure, while it is always at liberty to move to and fro longitudinally.

If the coupling $g$, combined with the lower hook, $h$, is turned in such a direction as to lengthen the draw-bar, the hook will fall out of gear with the upper hook to the position shown in Fig. 4. When two adjoining cars have to be coupled together, the hook $h'$, being uppermost, has to be projected outward by the adjustment of the draw-bar, with which it is combined, until its arms $s'\ s'$ are in a position to fall over the hook $h$, after which the draw-bar is shortened, and the coupling will be complete.

Instead of a worm and worm-wheel, other gearing may be employed to impart the desired movement to the coupling $g'$.

In case a car provided with a common coupling-link is to be attached to a car provided with my improved coupling, nothing more will be necessary than to elevate the hook $h$ out of the way, so as to expose the ordinary hook $a$ for receiving the link.

I claim as my invention—

1. The combination of the draw-bar $i$, its hook, the coupling-hook $h$, having an opening, $o$, and arm $d$, and the spring $f$, to maintain the hook in an extended position, but capable of yielding and allowing the hook to descend, all as set forth.

2. The screw-coupling $g$, uniting the two ends of the draw-bar and rendering the same adjustable, in combination with the hook $h$ and its arms $s$ and $d$, and spring or stop $f$, as set forth.

In testimony whereof I have signed my name to this specification in the presence of two subscribing witnesses.

ANDREW COULTER.

Witnesses:
 THOS. COULTER,
 PAULIS SCHWARTZ.